(No Model.)  3 Sheets—Sheet 1.

R. O. HOOD.
ELECTRIC METER.

No. 549,886.  Patented Nov. 12, 1895.

Witnesses:
Arthur L. Randall
Marcus B. May

Inventor:
R. O. Hood
By Amos C. Crossley, Atty.

(No Model.) 3 Sheets—Sheet 2.
R. O. HOOD.
ELECTRIC METER.
No. 549,886. Patented Nov. 12, 1895.
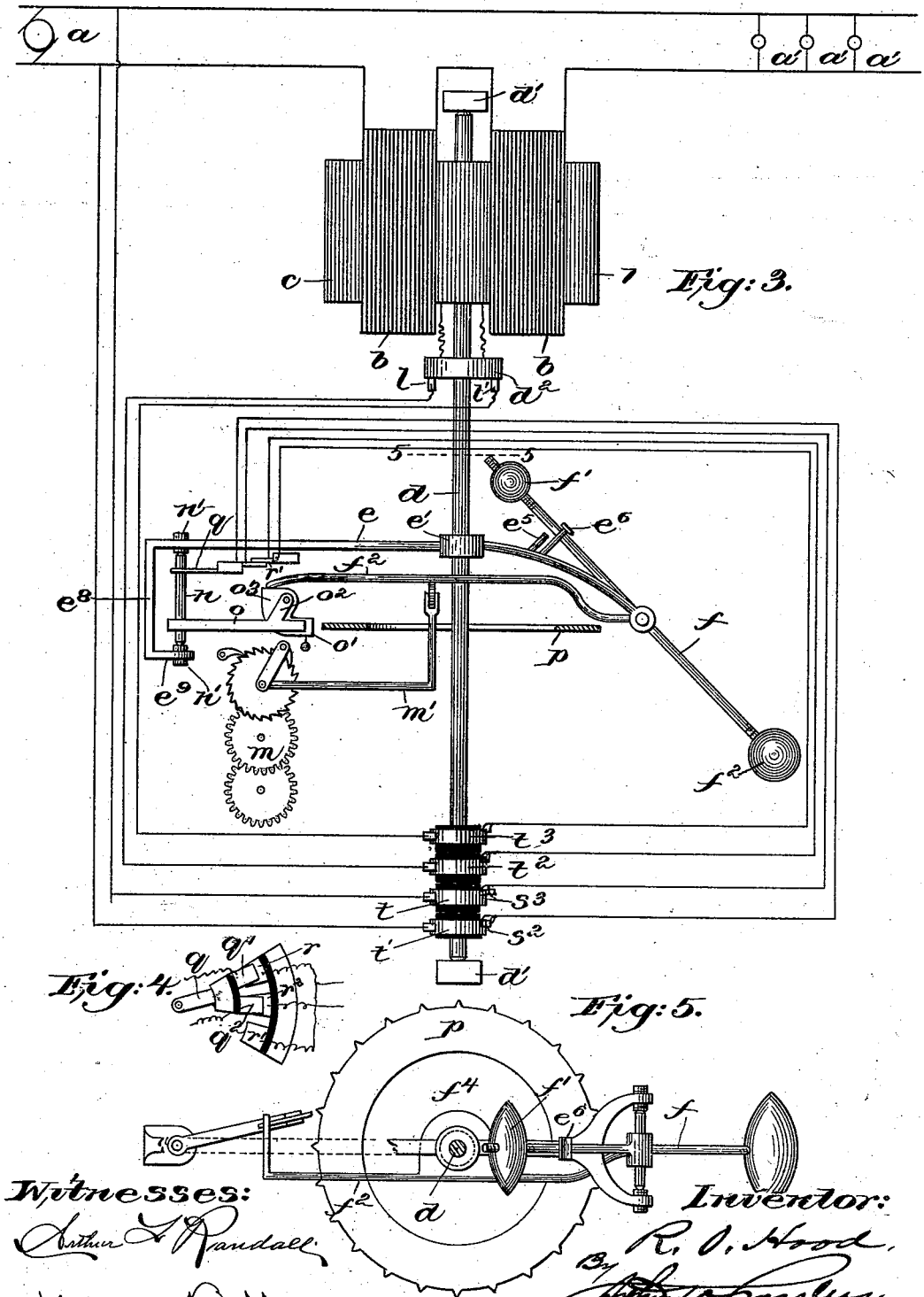

(No Model.) 3 Sheets—Sheet 3.

R. O. HOOD.
ELECTRIC METER.

No. 549,886. Patented Nov. 12, 1895.

Witnesses:
Arthur A. Randall
Marcus B. May

Inventor:
R. O. Hood
By Arthur C. Crossley, Atty.

UNITED STATES PATENT OFFICE.

RALPH O. HOOD, OF DANVERS, MASSACHUSETTS.

ELECTRIC METER.

SPECIFICATION forming part of Letters Patent No. 549,886, dated November 12, 1895.

Application filed June 8, 1895. Serial No. 552,167. (No model.)

*To all whom it may concern:*

Be it known that I, RALPH O. HOOD, of Danvers, in the county of Essex and State of Massachusetts, have invented certain new and useful Improvements in Electric Meters, of which the following is a specification.

This invention relates to electric meters for use on either continuous or alternating currents, and is based upon the principle that a force gives a definite velocity to a constant mass in a period of time inversely proportional to the force. Therefore if the force which varies with the consumption of a current or the electricity in use be made to act upon a mass so as to intermittingly move it alternately in opposite directions a record of such movements of the mass will indicate the consumption of the current.

The object of this invention is the production of a meter which will record the amount of electricity consumed on the lightest possible loads, as well as very heavy loads, without any appreciable errors.

The invention consists of a movable structure acted on dynamically by a coil placed in the circuit to be measured, devices for automatically and intermittingly reversing the movement of the structure, and means for recording the operations of said structure or the effects produced by the devices.

It also consists in devices for automatically reversing the direction of movement of the armature when it has reached a predetermined rate of speed in either direction by a mechanism under the control of the armature, and further consists of devices for reversing the current in the armature-coils by shifting the commutator relatively to the brushes and the armature-shaft, whereby the current through the armature-coils is reversed.

The invention likewise consists of the various features of construction and arrangement which will be hereinafter described and pointed out.

Reference is to be had to the annexed drawings, and to the letters marked thereon, forming a part of this specification, the same letters designating the same parts or features, as the case may be, wherever they occur.

Figure 1:
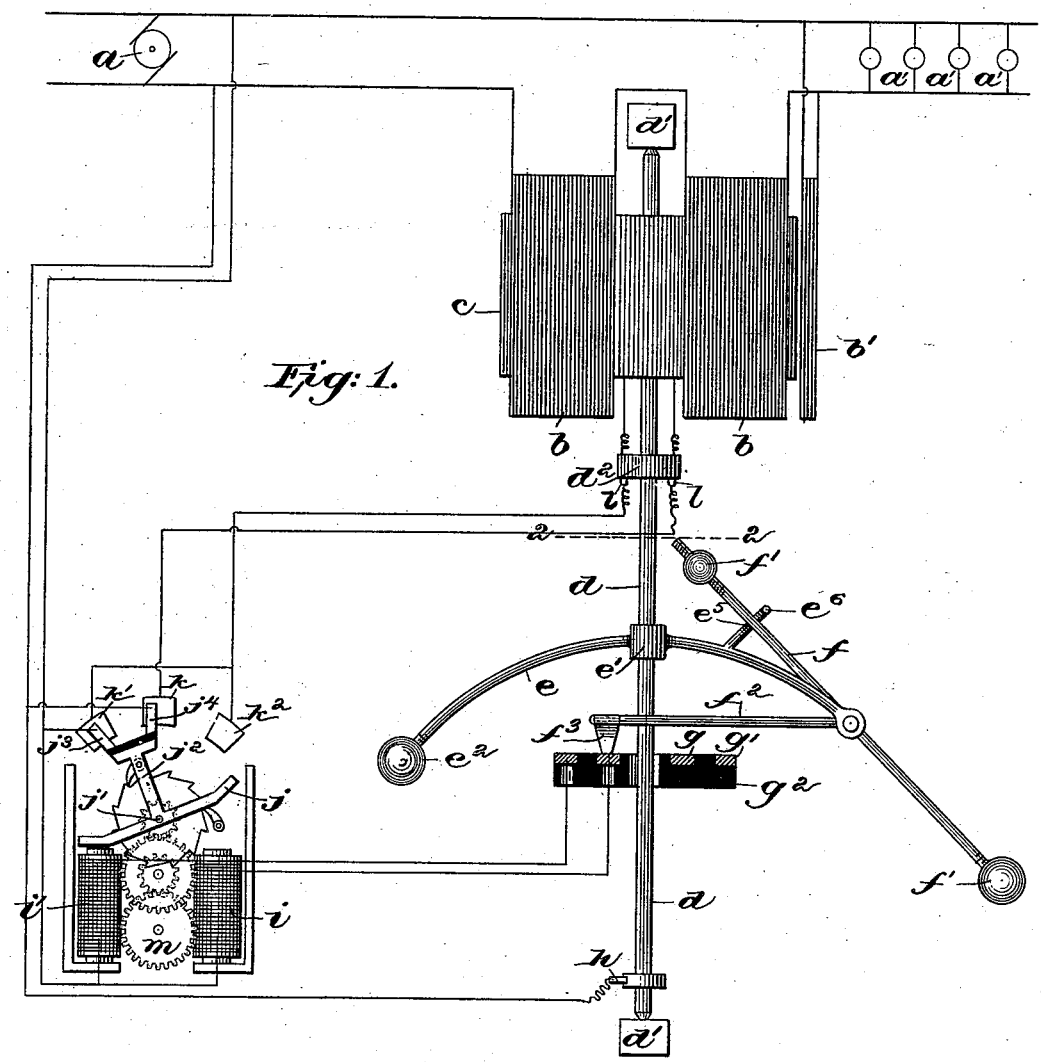
Figure 2:
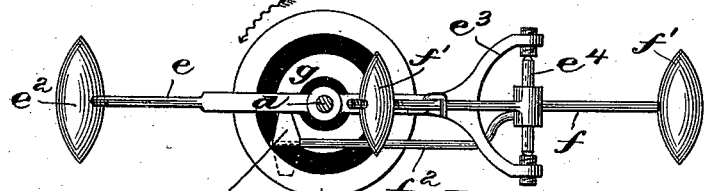
Figure 6:
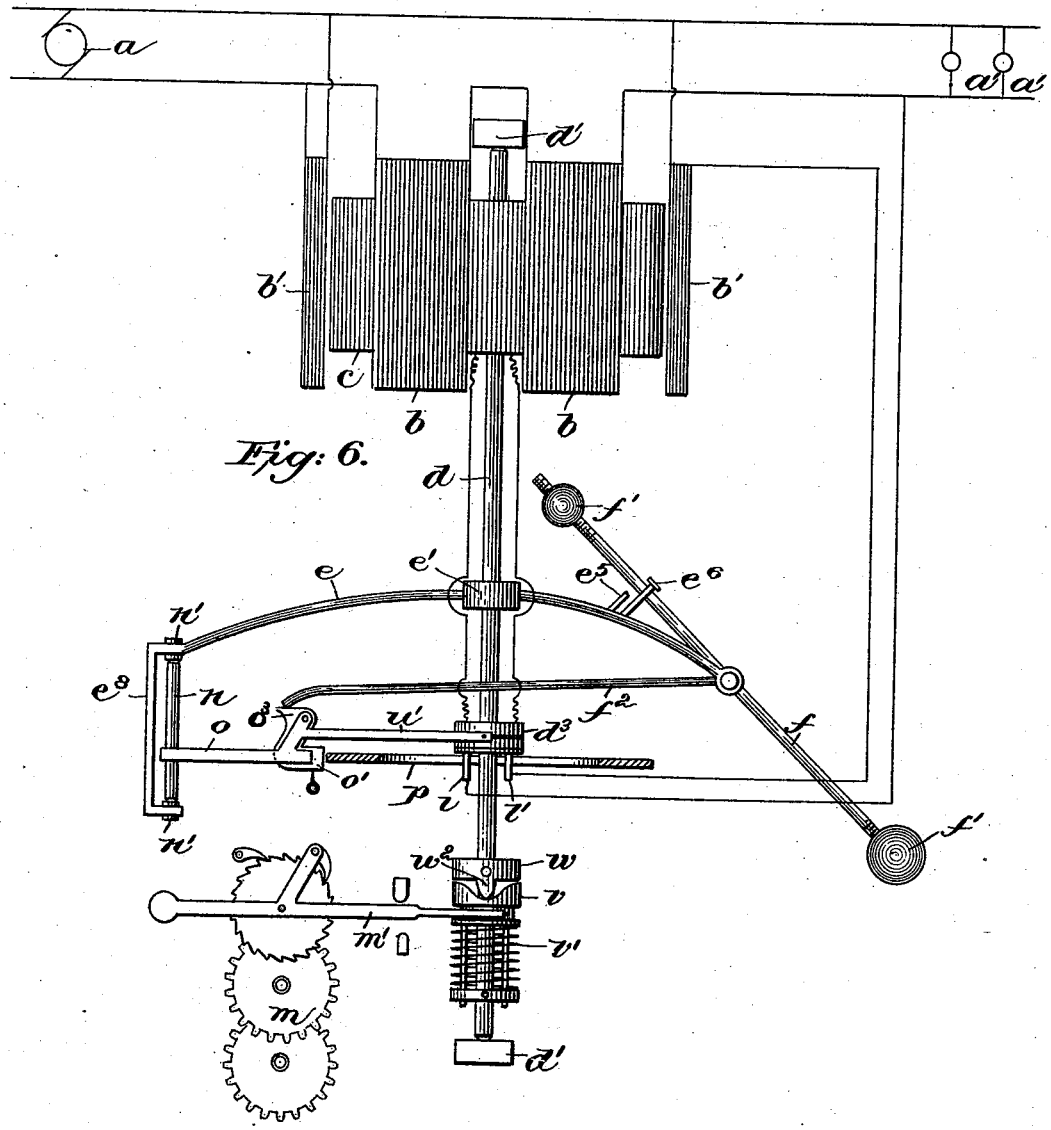
Figure 7:
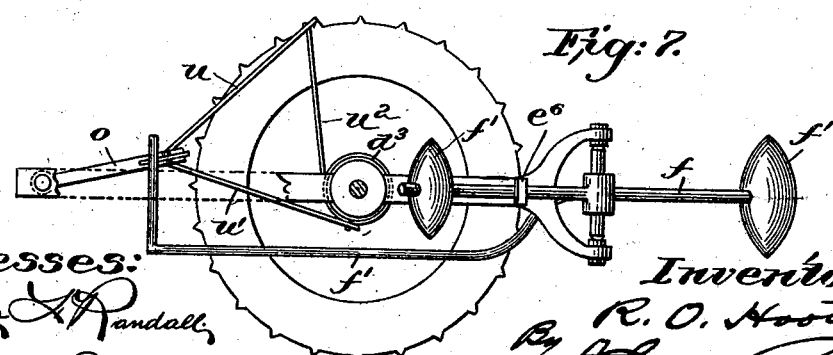

On the drawings, Figure 1 is a diagrammatic view showing the circuits and the various parts of my invention. Fig. 2 is a plan view, partially in section on the line 2 2 of Fig. 1, of the switch-controlling mechanism. Fig. 3 is a diagrammatic view illustrating other devices embodying my invention. Fig. 4 is a detail view of a portion of the switch mechanism. Fig. 5 is a section on the line 5 5 of Fig. 3. Figs. 6 and 7 illustrate a meter in which the invention is embodied, different in some of its features from those shown in the other figures.

My invention may be embodied in many meters of differing forms, and it is to be understood that it is not limited in any way to the devices which I shall now proceed to describe, for many changes may be made in them without departing from its spirit and scope.

Referring more particularly to Figs. 1 and 2, it will be seen that I have shown the main-line circuit to be measured as having a generating source $a$ and consuming devices $a'\,a'$. In this circuit I place an electric motor having field-cores $b$ connected in series therewith and a rotatable armature $c$ connected in a shunt-circuit. Starting-coils are also provided in shunt-circuit, being indicated at $b'$. As there is no iron used in the coils of the motor and the speed thereof being very low, the force which is exerted between the fixed coils $b$ and the movable armature-coils $c$ (which latter have a high resistance) varies with the energy consumed in the work circuit, as is now well known, this principle being applied in meters of numerous sorts.

The armature-shaft $d$ is longitudinally extended and is journaled in bearings indicated at $d'\,d'$, being provided with the usual commutator $d^2$, connected, as aforesaid, in a shunt-circuit with the main work circuit. In said shunt-circuit I place a switch mechanism for reversing the current through the armature-coils, thereby causing the armature to intermittingly rotate alternately in opposite directions, and combine therewith devices for automatically operating the switch mechanism when the armature has reached in its rotations a predetermined rate of speed, as I will now proceed to describe.

Upon the armature-shaft $d$ I rigidly mount a bar $e$, having a hub $e'$, and also having thereon a weight $e^2$, which is internally threaded to receive the threaded end of the bar, whereby it may be adjusted so as to provide a proper balance. The other end of the bar $e$ is forked at $e^3$, and is provided with inwardly-projecting bearings, in which is journaled a cross-shaft $e^4$. Rigid with the shaft is the governor-bar $f$, provided at its ends with adjustable weights $f'$ and lying at about an angle of forty-five degrees to the armature-shaft, being limited in its movements by two stops $e^5$ $e^6$ on the bar $e$. Either or both of the weights $f'$ are adjustable, so as to preserve the balance of the governor-bar. Rigid with the bar $f$ is an arm $f^2$, extending in past the armature-shaft and provided with a pendent brush $f^3$, loosely pivoted on the end thereof. Surrounding the armature-shaft $d$ and electrically disconnected therefrom are two concentric rings $g$ $g'$, mounted on an insulating centrally-open disk $g^2$. The parts are so correlated that when the armature is stationary the upper part of the governor-bar $f$ will rest against the stop $e^6$ and the pendent brush $f^3$ on the arm $f^2$ will hang free of the rings; but when the armature is rotated in the direction of the arrow in Fig. 2 with a sufficient definite speed the lower weight $f'$ on bar $f$ will be thrown outward by centrifugal action and the arm $f^2$ consequently lowered until the brush $f^3$ sweeps around the inner ring $g$, and if the armature be rotated in the opposite direction with a predetermined speed the same results will follow, save that the brush will sweep around the outer ring $g'$, as shown by dotted lines in Fig. 2.

By providing a governor-bar which is weighted at each end and lies at an acute angle to the axis around which it revolves I am enabled to operate the arm $f^2$ quickly, as the bar $f$ is sensitive to the highest degree to the rotation of the armature-shaft. The weights are nearly balanced; but the lower weight is thrown to a remote distance from the axis around which it revolves, so that it moves at a higher speed than it would if it hung pendent from the forked end of the bar $e$, and hence is under the influence of centrifugal action to a greater extent and will be operated when the armature-shaft rotates very slowly.

$h$ is a brush resting against the armature-shaft and forming a shunt-circuit, in which are arranged two magnets $i$ $i'$. Magnet $i$ is electrically connected to the contact-ring $g$ and magnet $i'$ is connected to contact-ring $g'$, so that when the brush $f^3$ is in contact with ring $g$ magnet $i$ will be energized, and magnet $i'$ is similarly affected when the brush $f^3$ makes contact with ring $g'$, as will be understood. $j$ is an armature pivoted at $j'$ and bent so as to have an end adapted to be attracted by each of the magnets, it being also provided with an arm $j^2$, carrying two contacts $j^3$ $j^4$, suitably insulated from each other. When the magnet $i'$ has been energized and the left end of the armature $j$ has been drawn down, contact-strips $j^3$ and $j^4$, respectively, make contact with contact-plates $k'$ and $k$, and when the arm $j^2$ has been swung to the right by reason of the magnet $i$ being energized they make contact with plates $k$ and $k^2$, respectively. Plate $k$ is directly in circuit with one of the commutator-brushes $l$ and plates $k'$ $k^2$ are directly in circuit with the other brush $l$, and contact-strips $j^3$ $j^4$ are connected with the two lines, respectively, of a shunt-circuit, so that when the magnets $i$ and $i'$ are energized in succession the current through the armature $c$ is reversed, causing it to rotate intermittingly in opposite directions.

The pivot-shaft $j'$ of the armature $j$ is connected with a registering mechanism $m$, so that the double movements of the armature $j$ are recorded. The means, however, for operating the registering mechanism, as well as the registering mechanism itself, are illustrated more or less conventionally, and it is to be understood that the movements of the armature may be recorded by any devices known to those skilled in the art.

Thus by the foregoing description, in connection with the drawings, it will be clearly seen that when the armature, rotating in the direction of the arrow in Fig. 2, has reached a predetermined rate of speed, the brush $f^3$ will make contact with the inner ring $g$, the magnet $i'$ will be energized, drawing the armature down toward it, the contact-strips $j^3$ $j^4$ will be shifted, the current in armature $c$ will be reversed, and the armature will begin to revolve in the other direction until a definite speed is reached, when its movement will be again reversed.

The number of times that the movements of the armature will be reversed in a given time will be dependent upon the load upon the main circuit—i. e., the amount of electricity consumed therein.

In the meter shown in Figs. 3, 4, and 5 the switch mechanism is supported upon the revolving structure mounted upon the armature-shaft. The bar $e$ is provided with a depending bar $e^8$, with an inwardly-projecting end $e^9$. Bearings are also provided at $n'$, in which a vertical shaft $n$ is mounted, the latter having an inwardly-projecting bar $o$, rigid therewith. The inner end of the bar is forked to receive a flexible metallic trip $o'$, the latter being pivoted in standards $o^2$, rising from said bar and hanging normally in the position shown in Fig. 3. Said trip is also provided with an outwardly-projecting lever $o^3$, which the arm $f^2$ is adapted to engage and press down when the armature reaches a certain speed of rotation, as will be understood.

$p$ is a ring arranged concentrically with the armature-shaft and having teeth projecting outward in the horizontal plane of the trip $o'$, so that when the armature has reached a predetermined speed the governor-bar will cause arm $f^2$ to press against the lever $o^3$ of the trip and cause the said trip to be thrown inward, so as to engage the teeth and swing the arm $o$ in the opposite direction.

The shaft $n$ is provided with an inwardly-projecting arm $q$, having two contact-strips $q'$ $q^2$ insulated from each other and adapted to make contact with plates $r$ $r^2$, respectively, or $r'$ $r^2$, respectively, as the arm $o$ is swung back and forth. The contact-strips $q'$ $q^2$ on the arm $q$ are respectively connected with brushes $s^2$ $s^3$ on both sides of the shunt-circuit, resting upon contact-rings $t$ $t'$, and contacts $r$ $r^2$ are similarly connected, respectively, with rings $t^2$ $t^3$, with which commutator-brushes $l$ $l'$ are also connected.

The reversal of the movement or the armature is effected when the latter revolves with a predetermined speed by the arm $f^2$ bearing down on the lever $o^3$ and causing the trip to engage one of the teeth of the ring $p$, thereby throwing arms $o$ and $q$ to one side and shifting the contact-strips $q'$ $q^2$, which will reverse the current in the armature, as will be readily understood by one skilled in the art.

The recording mechanism is operated by a circular plate $f^4$ on the arm $f^2$, which bears down upon a lever $m'$, provided with a pawl.

In Figs. 6 and 7 I show the preferred form of meter, in which I dispense with the use of a complicated switch mechanism. The governor-bar and the bar $e$ are similar to those in Fig. 3, and the bar $e$ is likewise provided with a pivot-shaft $n$, having an inwardly-projecting swinging arm $o$. The arm $o$ is provided with a flexible trip $o'$, adapted to be thrown into engagement with the toothed ring $p$ by the arm $f^2$. Projecting from the arm $o$ are two diverging arms $u$ $u'$, connected by a flexible cord or wire $u^2$, which is passed around the commutator. The commutator $d^3$ is in circuit with the armature-coils in the usual way, but is mounted loosely upon the armature-shaft, so as to be capable of rotating thereon. The brushes $l$ $l'$ are stationary, as usual.

The direction of movement of the armature is reversed in the following way: When the structure has reached a certain speed of revolution, the governor-bar causes the bar $f^2$ to impinge upon and press down on the lever $o^3$ and throw the trip inward, so as to engage the teeth of the ring $p$. The continued rotation of the structure forces the arm $o$ to one side, which, through the medium of the bars $u$ $u'$ and the flexible cord, partially rotates the commutator and reverses the direction of current through the armature. This operation is reversely repeated when the structure reaches a predetermined rate of speed in the other direction.

The operations of the commutator are registered upon a recording mechanism at $m$.

The recording mechanism is operated by means of a cam-disk $v$, which is adapted to press down upon the arm $m'$. The cam-disk $v$ rotates with the shaft, but has a sliding movement relatively thereto, being normally held in position by a spring $v'$. $w$ is a sleeve rigid with the commutator and having a projection $w^2$, adapted to ride over the cam-face of the disk and press the latter downward intermittingly whenever the commutator is reversed on the armature-shaft.

Having thus explained the nature of the invention and described a way of constructing and using the same, though without attempting to set forth all of the forms in which it may be made or all of the modes of its use, it is declared that what is claimed is—

1. An electric meter, comprising in its construction, an electric motor, a device for reversing the direction of movement of the movable part of said motor after it has reached a definite velocity, and a recording mechanism.

2. An electric meter, comprising in its construction, a coil in the circuit to be measured, a structure under the dynamic influence of said coil whereby it is rotated, a device for intermittingly reversing the movement of the structure when it reaches a definite velocity in each direction, and mechanism for recording the operations of said device.

3. An electric motor adapted to intermittingly accelerate its movable mass from a state of rest to a definite velocity of rotation in either direction, and provided with means for automatically and intermittingly reversing the action of the motor, when said movable mass has reached the definite velocity of rotation, to retard the rotation of the movable mass until it reaches a state of rest.

4. In an electric meter, the combination of an electric motor adapted to intermittingly and alternately accelerate its movable mass from a state of rest to a definite velocity of rotation in either direction, and provided with means for automatically and intermittingly reversing the action of the motor when said movable mass has reached the definite velocity of rotation whereby said movable mass is retarded until it reaches a state of rest and a recording mechanism.

5. The combination of a motor having its fixed coils in the main circuit, and its movable coils in a shunt circuit, a mechanism for alternately reversing the current in said movable coils, and a device actuated by the motor for intermittingly operating said reversing mechanism when the movable coils have reached a definite velocity of rotation in each direction respectively.

6. In an electric meter, the combination of a motor having fixed coils and movable coils, a mechanism for reversing the current through the movable coils, whereby the movable coils are alternately moved in opposite directions, and a centrifugal device under the control of the movable coils for operating said switch mechanism.

7. In an electric meter, the combination of a reversible motor having its fixed coils in series with the main circuit, and its movable coils in a shunt circuit, and having an additional fixed starting coil placed in a shunt to the main circuit, of a device for retarding said movable coils when they have reached definite velocities in opposite directions respectively, and a recording mechanism.

8. An electric meter comprising in its construction a motor having its fixed coils in the main circuit, and its armature coils in a shunt circuit, a device mounted on the armature shaft for reversing the current in the armature coils, a centrifugal device supported on the armature shaft for intermittingly operating the reversing device, and a recording mechanism.

9. An electric meter, comprising in its construction, a motor having fixed coils, and movable armature coils, a bar mounted transversely upon the armature shaft, a device mounted on said bar for reversing the current through the armature coils, a governor supported by the said bar for intermittingly operating said reversing device, and a recording mechanism.

10. The combination of a motor having fixed coils and movable armature coils, a fixed device, and a revoluble mechanism for reversing the current through the armature coils, and adapted to impinge upon said fixed device whereby it is operated.

11. The combination of a motor having fixed coils and movable armature coils, a device supported upon the armature shaft for reversing the current through the armature coils, a fixed device, and a governor for causing the reversing device to impinge upon the fixed device whereby it is operated, substantially as set forth.

12. The combination of a motor having fixed coils and movable armature coils, a fixed toothed ring, a device supported upon the armature shaft for reversing the current through the armature coils, and having a movable part, and mechanism actuated by the armature coils and adapted to impinge upon said movable part of the reversing device to cause it to engage said toothed ring whereby the continued movement of the armature will cause said reversing device to be actuated.

13. The combination of a motor having fixed coils and movable armature coils of a bar mounted upon the armature shaft and moving therewith, a device for reversing the current in the armature coils and pivoted upon one side of said bar, a governor mounted upon the other side of said bar and having a part adapted to engage said reversing device, and a fixed means with which the reversing device may engage to be operated when engaged by said part of the governor.

14. A governor for an electric motor consisting of a frame rotating with the armature thereof, a bar centrally pivoted upon said frame out of the lines of the armature shaft, weights at each end of said bar, and means for maintaining said bar at an inclination to the axis around which it revolves, substantially for the purposes described.

15. As a means for controlling the speed of a motor, a bar supported eccentrically of the armature axis, and revolving with the armature, said bar being weighted at each end, and pivoted at a point between its ends, substantially as and for the purpose described.

16. The combination with the fixed coils of a motor, the armature coils, and the armature shaft, of a fixed device, stationary brushes, a commutator loose upon its shaft, and means for intermittingly engaging said commutator with said fixed device whereby it is turned upon the armature shaft to reverse the current through the armature coils.

17. In a meter, the combination with the fixed coils of a motor, the armature coils, and their supporting shaft, of stationary brushes, a commutator loose on said supporting shaft, means for intermittingly turning said commutator upon its shaft when the armature coils reach a definite velocity in their rotation in either direction, whereby the current through the armature coils is intermittingly reversed, and a recording mechanism, substantially as set forth.

In testimony whereof I have signed my name to this specification, in the presence of two subscribing witnesses, this 1st day of June, A. D. 1895.

RALPH O. HOOD.

Witnesses:
MARCUS B. MAY,
J. E. HUTCHINSON.